United States Patent [19]

Branover et al.

[11] Patent Number: 4,828,610
[45] Date of Patent: May 9, 1989

[54] METHOD AND APPARATUS FOR MODIFICATION OF THE RATE OF HEAT OR MASS TRANSFER IN A STREAM OF LIQUID METAL

[75] Inventors: Herman Branover; Semion Sukoriansky, both of Beer Sheva, Israel

[73] Assignee: Solmecs Corporation N.V., Curacao, Netherlands Antilles

[21] Appl. No.: 50,370

[22] Filed: May 18, 1987

[30] Foreign Application Priority Data

Jun. 16, 1986 [IL] Israel ......................................... 79125

[51] Int. Cl.$^4$ ............................. C22B 4/00; C22B 7/00
[52] U.S. Cl. .................................. 75/10.16; 75/65 ZM
[58] Field of Search ..................... 75/65 ZM, 10.16, 26

[56] References Cited

U.S. PATENT DOCUMENTS 3,440,731  4/1969  Tuthill ..................................... 75/26

OTHER PUBLICATIONS

A Heating Pipe Concept for Cooling a Liquid-Pool Blanket of a Tandem Mirror Fusion Reactor, Nancy L. Schwertz et al., Nuclear Technology/Fusion, vol. 4, Nov. 1983, pp. 479-490.

Design of Self-Cooled, Liquid-Metal Blankets for Tokamak and Tandem Mirror Reactors, Yung Sheng Cha et al., Fusion Technology, vol. 8, Jul. 1985, pp. 90-113.

Primary Examiner—Peter D. Rosenberg
Attorney, Agent, or Firm—Sughrue, Mion, Zinn, Macpeak and Seas

[57] ABSTRACT

The rate of heat or mass transfer in a stream of liquid metal is enhanced by producing a stream of liquid metal in a conduit, creating turbulent flow at least in one plane of the stream and at least in a section of the conduit, and applying a magnetic field to the turbulent flow at least in a direction which is non-parallel to the plane, thereby amplifying intensity and scale of the turbulence and reducing the rate of viscous turbulent energy dissipation to cause an enhancement of heat or mass transfer-rate.

5 Claims, 3 Drawing Sheets

NUSSELT NUMBER (Nu) AS A FUNCTION OF
REYNOLDS NUMBER (Re)

(a) LAMINAR
(b) TURBULENT
(c) ENHANCED TURBULENCE

DIFFERENCE BETWEEN FIRST WALL AND BULK TEMPERATURE AS
A FUNCTION OF AVERAGE VELOCITY (a) LAMINAR
(b) TURBULENT
(c) ENHANCED TURBULENCE

METHOD AND APPARATUS FOR MODIFICATION OF THE RATE OF HEAT OR MASS TRANSFER IN A STREAM OF LIQUID METAL

BACKGROUND OF THE INVENTION

The present invention relates to a method and apparatus for the enhancement of the rate of heat or mass transfer in a stream of liquid metal.

It is commonly accepted that the interaction between a magnetic field and a liquid metal, LM, flow leads, in a fusion reactor blanket environment, to the suppression of turbulence, and thus to a reduction in the heat-transfer rate. When the magnetic field direction is transverse to the LM flow direction, the reduction in the heat-transfer coefficient, coupled with an increase in the pressure drop along the LM coolant channel, can significantly complicate the design of self-cooled LM blankets. For example, the poloidal-flow blanket configuration (in which the lithium flows around the axis of the plasma column in, e.g., the experimental tokamak fusion reactors) was found to be geometrically the simplest among all the design options (for a self-cooled liquid metal blanket for tokamaks) considered. However, in designing this blanket it was found that the average LM velocity required to maintain the maximum interface (i.e., first-wall) temperature at an acceptable level is too high for either thermal efficiency point-of-view or from MHD pressure drop (which determines the maximum primary stress level) point-of-view. Consequently, a more complicated toroidal/poloidal geometry was selected for the self-cooled liquid metal blankets recently designed.

The analysis of the poloidal blanket (as of most, if not all, of the self-cooled LM blankets considered so far) assumed a "slug" flow regime, namely, a complete suppression of turbulence and a flat velocity profile. However, there exists experimental evidence that, in the case of a transverse magnetic field, strong residual flow disturbances persist with an increase in the field intensity even when the LM flow is "laminarized", in the sense that the friction corresponds to a laminar theory. These disturbances even strongly increase, in some cases, with an increase in the field intensity.

It is generally supposed that in the presence of a very strong magnetic field, turbulence is completely suppressed and the flow can be treated as laminar up to the highest values of Reynolds numbers typical for self-cooled, liquid metal blankets. It has been proven experimentally that this assumption is definitely valid in relation to calculation of friction (pressure drop). Indeed, the most general empirical formula for critical Reynolds number ($Re_{cr}$) corresponding to laminar-turbulent transition in the presence of a transverse magnetic field is:

$$Re_{cr} = Ha(215 - 85 \exp(-0.35\beta)) \quad (1)$$

where $\beta = b/a$ is the flow channel aspect ratio of a rectangular duct having wall lengths of $2a$ and $2b$, respectively, and Ha is the Hartman number.

Expression (1) is applicable to flows in ducts of any rectangular cross section. For a circular pipe expression (1) is also valid with $\beta = 1$. It turns out that for the flow conditions typical for fusion reactor blankets, $Re < Re_{cr}$ so that the pressure drop can be calculated assuming that the flow is laminar.

The situation is not as clear in the case when liquid metal flows parallel to the magnetic field, particularly when the flows are initially turbulent. Friction decreases under a strong parallel magnetic field, but "pure" laminar friction has not yet been observed.

Experimental studies which were carried out in accordance with the present invention indicate that even in the case of transverse flow, the turbulence suppression phenomena are much more complicated than just a gradual decrease of turbulent velocity fluctuations and their eventual disappearance with the increase in the field intensity. As observed, even after the flow is "laminarized" in the sense that the friction corresponds to laminar theory, strong residual flow disturbances still exist. These disturbances can strongly increase in some cases when the magnetic field increases. Thus it has been established that the presence of a strong transverse magnetic field, which suppresses the velocity fluctuation parallel to the field, can, as a result of an inverse energy cascade, both enhance the velocity fluctuations perpendicular to the field and increase the integral scale of turbulence. The resulting strongly non-isotropic turbulent field causes no substantial momentum transfer (i.e., no pressure drop enhancement), but can enhance heat transfer.

SUMMARY OF THE INVENTION

In accordance with the present invention there is provided a method for the enhancement of the rate of heat or mass transfer in a stream of liquid metal, comprising:
  producing a stream of liquid metal in a conduit;
  creating turbulent flow at least in one plane of said stream and at least in a section of said conduit, and
  applying a magnetic field to said turbulent flow at least in a direction which is non-parallel to said plane,
  thereby amplifying intensity and scale of said turbulence and reducing the rate of viscous turbulent energy dissipation to cause an enhancement of heat or mass transfer-rate.

The invention further provides an apparatus for the modification of heat or mass transfer in a stream of liquid metal, comprising:
  a conduit in which liquid-metal is adapted to stream;
  turbulizing means for causing turbulent flow at least in one plane in a stream of the liquid metal flowing in said conduit, and
  means for applying a magnetic field to said turbulent flow at least in a direction which is non-parallel to said plane for amplification of the turbulent intensity and scale and reduction of the rate of viscous turbulent energy dissipation to cause a modification of heat or mass transfer rate.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
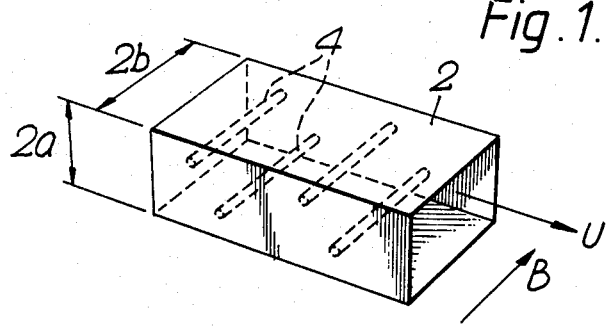
FIG. 1 is a schematic view of a rectangular conduit fitted with turbulizing bars.

Referring to FIG. 1 there is shown a rectangular conduit 2 having wall lengths of 2a and 2b, respectively, in which there are disposed turbulizing means 4, in the form of spaced-apart bars or rods, extending across the direction of flow of a liquid metal stream of a velocity U adapted to flow inside the conduit 2. Further indicated in the figure by an arrow B is the direction of a magnetic field which is applied to the liquid metal flowing inside the conduit 2. The magnetic field can be produced by any known per se conventional means, for example, electromagnets, and thus for clarity only the direction of the field is indicated.

Figure 2:
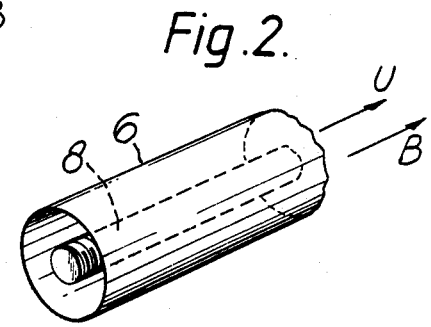
FIG. 2 is a schematic view of a circular conduit fitted with a screw or worm-type turbulizing means.

In FIG. 2 there is illustrated a circular conduit 6 in which there is disposed a screw or worm type member 8 extending along the direction of flow of liquid metal inside the conduit and in which the direction of the applied magnetic field B is parallel to the direction of flow of the liquid metal.

While the turbulizing means 4 of FIG. 1 causes turbulences and more specifically, vortices in a plane whose axes are substantially normal to the direction of the stream in the conduit, the turbulizing means 8 of FIG. 2 create turbulences whose planes are expanding from the center of the conduit 6 outwards toward the inner wall of the conduit. In order to amplify these turbulences, namely in order to increase the turbulence intensity and scale, thereby reducing the rate of viscous turbulent energy dissipation, there is applied to the turbulences a magnetic field B in a direction which is non-parallel to the plane of the turbulences. Hence as can be seen in the illustrative figures, depending on the turbulizing means used, the axes of the turbulences' planes may vary with respect to the direction of flow of the liquid metal inside the conduit and likewise, the direction of the applied magnetic field.

It should be further noted that the creation of turbulences in the stream of liquid metal inside the conduit in which it flows could be effected by any desired means and is not limited to the mechanical-type obstacles shown in FIGS. 1 and 2. For example, any type of oscillators or pulsators, or electrical or electromagnetic excitators are within the ambit of the present invention and are meant to be included in the general term "turbulizing means".

Figure 3:
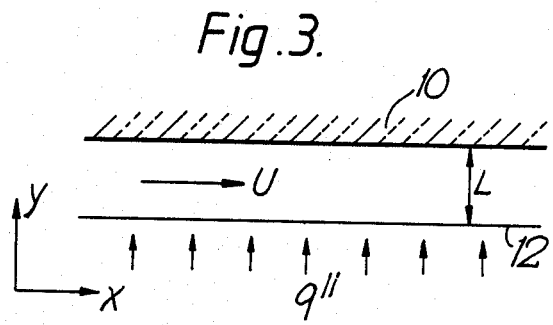
FIG. 3 is a schematic representation of a conduit for illustrating heat transfer problems.

Considering a stationary flow between two parallel plates as illustrated in FIG. 3, the corresponding heat transfer equation is:

$$u(y)\frac{\partial T}{\partial x} = \frac{\partial}{\partial y}\left(\chi_o\chi_T(y)\frac{\partial T}{\partial y}\right) + \frac{\dot{Q}(y)}{\rho C_p} \quad (2)$$

where $u(y)$ is the average velocity at y, $\chi_o$ is the molecular thermal diffusivity, $\chi_o\chi_T$ is the total thermal diffusivity; and Q is the volumetric heat deposition.

Equation (2) requires the definition of $\chi_T$. For locally isotropic fully-developed turbulent flows, a formula for thermal diffusivity was derived using the renormalization group method. If $\alpha$ is the inverse of the total Prandtl number ($\alpha = \chi_o\chi_T/\nu$), it satisfies the following relationship:

$$\left(\frac{\alpha - 1.1793}{\alpha_o - 1.1793}\right)^{0.65}\left(\frac{\alpha + 2.1793}{\alpha_o + 2.1793}\right)^{0.35} = \frac{\nu_o}{\nu} \quad (3)$$

where $\nu_o$ is the molecular viscosity and $\nu$ is the total viscosity. An expression for total viscosity at any location in the flow field was also derived. These expressions were then used to describe the process of heat transfer in turbulent pipe flow. The results were in good agreement with experimental data for Prandtl numbers typical for liquid metals.

The formula for the total viscosity includes the integral scale of turbulence and energy dissipation rate at any given location. Assuming that the integral scale of turbulence is proportional to a distance, y, from a wall, and that the energy dissipation is proportional to $\nu|\nabla u|^2$, the total viscosity reduces to $$\nu(y) = \nu_o\left[1 + H\left(0.22\nu\frac{(y)}{\nu_o^3}\left(\frac{du}{dy}\right)^2 y^4 - 100\right)\right]^{\frac{1}{3}} \quad (4)$$

where $H(x) = x$ if $x > 0$ and $H(x) = 0$ if $x < 0$.

Equations (2), (3) and (4), together with the momentum equation, form a closed system of equations.

As mentioned previously, the magnetic field laminarizes the friction. Therefore, for strong magnetic fields, the velocity profile can be calculated from the momentum equation with the total viscosity equal to the molecular viscosity. Analytical solutions are known for various geometries and boundary conditions. Alternatively, experimental data can be used for the velocity profile.

The evaluation of the thermal diffusivity in the presence of a magnetic field is a more difficult problem. It is no longer valid to assume locally isotropic turbulence. Fluctuations in the direction of a magnetic field are damped. Turbulence becomes strongly non-isotropic with pulsations mainly oriented in the plane perpendicular to the magnetic field.

From semi-empirical theories it is known that turbulent heat diffusivity is proportional to the product of the integral scale of turbulence and the turbulence intensity. Experimental results can be used to estimate the effect of a magnetic field on these factors. The experimental observations indicate that, as a result of an inverse energy cascade, both the integral scale of turbulence and the turbulence intensity are enhanced. The integral scale of turbulence can achieve the maximum value permitted by the geometry. The change in the turbulence intensity depends on the turbulizing means inside the magnetic field. Two examples will illustrate this point.

In a first example an obstacle in the form of a honeycomb was placed in a channel. In the absence of a magnetic field, the disturbances generated by the tail of the honeycomb did not influence the turbulence. However, when a magnetic field was applied thereto, the energy of these disturbances was cascaded to larger pulsations, thereby enhancing the turbulence intensity by a factor of approximately 2.

In a second example, turbulizing bars were placed in the duct. Being a stronger turbulizing means than the honeycomb, the turbulizing bars increased the turbulence intensity by a factor of about 4 even in the absence of a magnetic field. In the presence of a magnetic field, when the bars are oriented in the field direction, the amplification was 2 to 3 times greater, so that total amplification factor was approximately 10. Assuming that the integral scale of turbulence will increase by a factor of at least 2, it is anticipated that the turbulent heat diffusivity can be amplified by a factor of 20 or even more.

To illustrate the effect of turbulence on the heat transfer (see FIG. 3) a liquid metal is made to flow between two parallel planes 10 and 12 spaced-apart at a distance L. The plate 12 is subject to a constant heat flux and the plate 10 is thermally isolated. In this arrangement, for the plate 12:

$$\chi_o \chi_T \rho c_p \frac{\partial T}{\partial y} \bigg|_{y=0} = q''$$

and for the plate 10:

$$\frac{\partial T}{\partial y} \bigg|_{y=L} = 0.$$

For the present purposes, the heat generation term has the form $$\dot{Q} = \dot{Q}_o \exp(-cy)$$

Further, the flow is assumed to be fully developed thermally, i.e. T(x,y) is super position of a linear function of x and an unknown function of y.

A channel depth with typical dimensions for a poloidal channel were used: L=0.4 m. The laminar Prandtl number for lithium is 0.0362. The first wall was subjected to a heat flux q″=0.5 MW/m². A total power of 5.9 MW was deposited in the blanket per m² first wall area, and the factor c in the heat generation term was set to 3.5.

Figure 4:
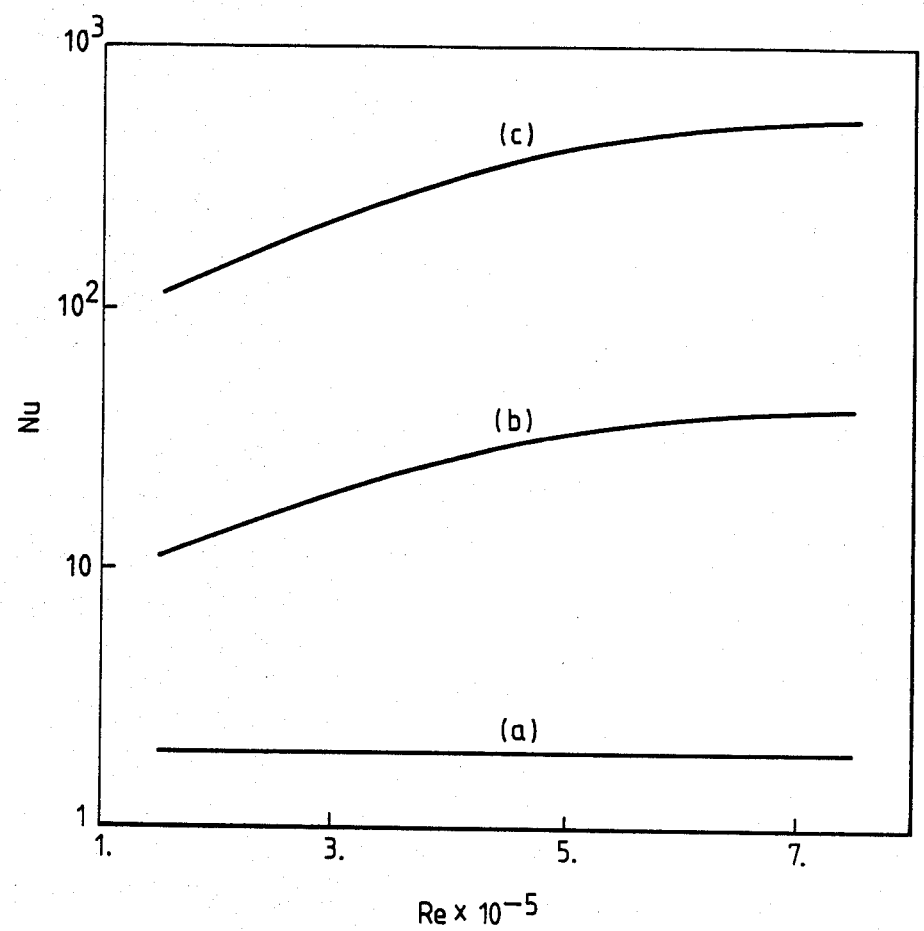
FIG. 4 is a graph showing characteristic curves of Nusselt numbers as a function of Reynolds numbers for laminar, turbulent and enhanced turbulence flows.
Figure 5:
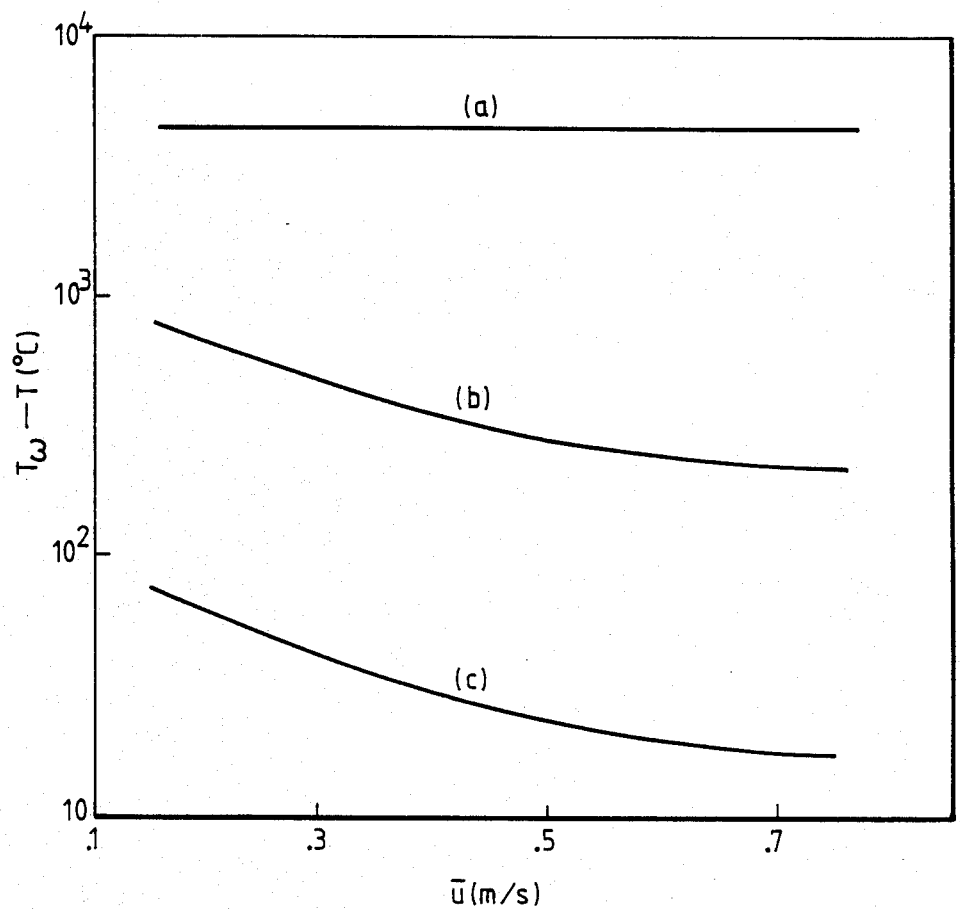
FIG. 5 is a graph showing characteristic curves of the difference between the first wall and bulk temperature as a function of average velocity of the flows of FIG. 4.

The Nusselt number Nu is defined as:

$$Nu = \frac{2q''L}{C_p \rho \chi_o (T_w - \overline{T})}$$

where $\overline{T}$ is the average liquid metal bulk temperature and $T_w$ is the first wall liquid metal interface temperature. The Nusselt number as a function of the Reynolds number is illustrated in FIG. 4. The difference between the first wall and bulk temperature for various average velocities is given in FIG. 5. The three cases presented in FIGS. 4 and 5 assume: (a) a laminar thermal diffusivity, (b) a turbulent thermal diffusivity for locally isotropic turbulence in the absence of a magnetic field, and (c) an enhanced turbulent thermal diffusivity as discussed above. In case (a), the large difference between $T_w$ and T occurs because the flow is assumed to be thermally fully-developed. For the poloidal blanket geometry, this assumption is not valid. An accurate calculation, which takes into account the transient effects, shows a much smaller temperature difference. For enhanced turbulence heat-transfer, case (c), the flow can be treated with reasonable accuracy as thermally fully-developed since the estimated Fourier number was greater than one.

Figure 6:
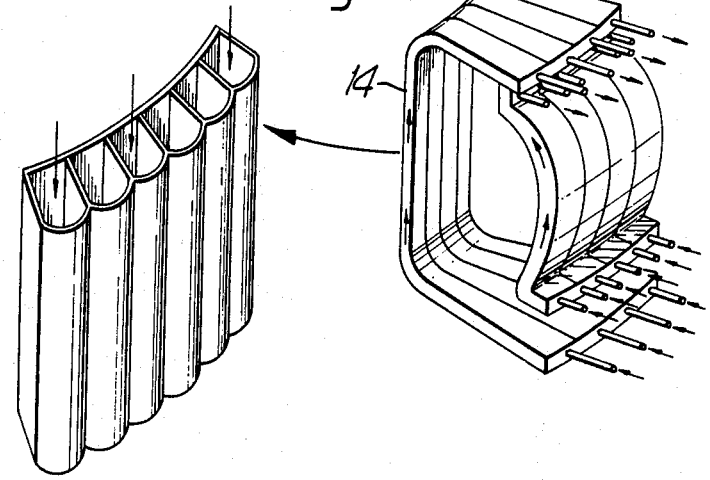
FIG. 6 is a schematic diagram of a simple poloidal flow blanket.

A schematic layout of the poloidal-flow blanket considered is shown in FIG. 6. It consists of simple conduits 14 with liquid metal flowing in the poloidal direction, perpendicular to the toroidal magnetic field. It is assumed that the first wall (FW) is 0.5 cm thick, the liquid metal blanket thickness is 40 cm and that the path length of the poloidal flow in the inboard channel is 12 m, where the flow is subjected to an average toroidal magnetic field of 7.5 Tesla. As mentioned above, the first wall is subjected to a heat flux of 0.5 MW/m² and the volumetric power deposition in the blanket is 5.9 MW per m² of first wall area, exponentially declining from the first wall.

If vanadium or vanadium alloy is used for the structural material, the first wall temperature is limited to 750° C. When subjected to a heat flux of 0.5 MW/m², a temperature drop of ±100° C. will be established across the wall. Consequently, the FW-LM interface temperature is limited to $T_{int}$±650° C. Thermal-hydraulic calculations carried out using conventional slug-flow model show that for the LM coolant to maintain a 650° C. interface temperature, its flow velocity should be at least u=0.75 m/s. At this velocity the pressure drop along the poloidal channel is nearly ΔP±12 MPa. This pressure is about four times higher than acceptable. Moreover, the temperature drop between the first wall and the bulk liquid metal is calculated to be ±300° C. This restricts the LM outlet temperature to $T_{out}$±350° C. which is too low to be of practical interest from energy conversion efficiency point of view. The corresponding LM bulk temperature increase along the inboard flow channel is approximately ΔT±75° C.

The situation becomes significantly worse if stainless steel is used for the structural material due to its lower permissible interface temperature with liquid metal.

Suppose, next, that the enhanced, two-dimensional turbulent flow regime prevails. When u-0.15 m/s, so as to reduce the pressure drop to Δp±2.4 MPa, the resulting bulk temperature increase is ΔT±365° C.

Using the methods and assumptions discussed hereinbefore, it was found that the FW-bulk LM temperature difference is ±75° C. For $T_{int}$=650° C., this implies $T_{out}$=575° C. and coolant inlet temperature of 210° C. Alternatively, choosing u=0.2 m/s and $T_{int}$=650° C., it is found that Δp=3.2 MPa, FW-bulk LM ΔT=55° C., $T_{out}$=595° C. and $T_{in}$=320° C. Hence, for a comparable Δp, $T_{out}$ of the poloidal blanket can be higher than that of the geometrically more complicated toroidal/poloidal blanket (Δp=2.85 MPa and $T_{out}$=550° C.) presently perceived to be the most attractive self-cooled LM blanket design concept. Another contribution of the enhanced turbulence is uniformity of the temperature distribution across the LM channel without the need for any mechanical measure.

The enhanced heat-transfer rate due to anisotropic turbulence could be very helpful in the design of high heat flux components of D-T fusion reactors, such limiters and divertors, in addition to its contribution to the design of more attractive first walls. Moreover, the enhanced heat-transfer could make advanced fuel fusion reactors more attractive than otherwise possible.

As described above, the anisotropic turbulence which can be established in a liquid metal flow perpendicular to the magnetic field might increase the Nusselt number by 2 orders of magnitude. The resulting enhancement in the heat transfer rate from the fusion reactor first wall to the liquid metal coolant enables improving self-cooled blanket designs in a number of ways, including the following:

Reducing the LM flow velocity, thus significantly reducing the MHD pressure drop in a transverse flow configuration;

Reducing the temperature drop between the first wall liquid metal interface and the liquid metal bulk flow, thus increasing the blanket coolant outlet temperature and, consequently, the attainable energy conversion efficiency; or A combination of the above.

It is found that the anisotropic turbulence enables designing a practical poloidal-flow blankets for tokamaks, offering performance characteristics, which are superior to those of the best blanket design concept identified so far, while offering simpler and, very likely, cheaper blanket designs. Alternatively, it is possible to design toroidal/poloidal flow blankets to have a lithium outlet temperature of 630° C., thus enabling the increase of the energy conversion efficiency.

The enhanced heat transfer rate due to the anisotropic turbulence might be very helpful for the design of special high heat-flux components, such as limiters. It could be very useful also for the design of advanced fuel fusion reactors, such as reactors based on the D-$^3$He fusion reaction. The power density attainable by these reactors will be limited by the first wall heat-flux (rather than by the neutron wall loading in D-T fusion reactors).

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for the enhancement of the rate of heat or mass transfer in a stream of liquid metal, comprising the steps of:
    (a) producing a flowing stream of liquid metal in a conduit;
    (b) creating turbulent flow in at least one plane of said stream and in at least a section of said conduit, and
    (c) applying a magnetic field to said turbulent flow in at least a direction which is non-parallel to said plane such that the intensity and scale of said turbulence are amplified and the rate of viscous turbulent energy dissipation is reduced to attendantly enhance the heat or mass transfer-rate.

2. The method as claimed in claim 1 wherein said turbulence is created by the introduction of at least one obstacle in the liquid metal stream.

3. The method as claimed in claim 1 wherein said turbulence is created by means of oscillating or pulsating means introduced in the liquid metal stream.

4. The method as claimed in claim 1 wherein said turbulence is created by means of electrical or electromagnetic excitation of the liquid metal.

5. The method as claimed in claim 1 wherein said turbulence flow is in the form of vortices flow, the axes of which vortices having a non-zero projection on the magnetic field causing the amplification of the turbulence flow.

* * * * *